United States Patent
Jinzaki et al.

(10) Patent No.: US 8,170,057 B2
(45) Date of Patent: May 1, 2012

(54) COMMUNICATION-PROCESSING APPARATUS AND ITS METHOD

(75) Inventors: Akira Jinzaki, Kawasaki (JP); Jun Kawai, Kawasaki (JP); Osamu Shimokuni, Kawasaki (JP); Junichiro Shitami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1180 days.

(21) Appl. No.: 10/944,494

(22) Filed: Sep. 17, 2004

(65) Prior Publication Data

US 2005/0190693 A1 Sep. 1, 2005

(30) Foreign Application Priority Data

Feb. 27, 2004 (JP) ................................ 2004-055368

(51) Int. Cl.
*H04L 12/66* (2006.01)

(52) U.S. Cl. ........................................ 370/469; 370/432

(58) Field of Classification Search .................. 370/469, 370/432, 390, 352
See application file for complete search history.

(56) References Cited

U.S. PATENT DOCUMENTS

| 7,058,723 | B2 * | 6/2006 | Wilson ........................... 709/235 |
| 2003/0014624 | A1 * | 1/2003 | Maturana et al. ............. 713/151 |
| 2004/0264366 | A1 * | 12/2004 | Swami ........................... 370/229 |
| 2005/0074007 | A1 * | 4/2005 | Samuels et al. ................ 370/392 |
| 2005/0114489 | A1 * | 5/2005 | Yonge et al. ................... 709/223 |

FOREIGN PATENT DOCUMENTS

| EP | 0 616 455 | 9/1994 |
| JP | 05-122278 | 5/1993 |
| JP | 05-183644 | 7/1993 |
| JP | 08-307410 | 11/1996 |
| JP | 11-196041 | 7/1999 |
| JP | 11-220512 | 8/1999 |
| JP | 2001-77881 A | 3/2001 |
| JP | 2001-237883 | 8/2001 |
| JP | 2001-308947 | 11/2001 |
| JP | 2001-333096 | 11/2001 |
| JP | 2002-77150 | 3/2002 |
| JP | 2002-247132 | 8/2002 |

OTHER PUBLICATIONS

European Search Report dated Dec. 16, 2005.
James F. Kurose et al. "Computer Networking, A Top-Down-Approach Featuring the Internet" Pearson Education, 2003, Chapter 3, XP002357124.
Willima Stallings. "Cryptography and Network Security, Principles and Practice" Prentice Hall, Chapter 13, XP002357178.
Communication pursuant to Article 96(2) EPC dated Jan. 23, 2007.
"Japanese Notice of Rejection Ground", Complete English language translation, mailed Aug. 4, 2009 from JP Patent Office for corresponding JP App. No. 2004-055368.

* cited by examiner

*Primary Examiner* — Huy Vu
*Assistant Examiner* — Dady Chery
(74) *Attorney, Agent, or Firm* — Fujitsu Patent Center

(57) ABSTRACT

A transmitter and a receiver each have an apparatus for carrying out retransmission processing at a TCP layer and an apparatus for carrying out encrypted-data communication at an IPSec layer. The apparatus operating at the IPSec layer has a buffer for storing encrypted data transmitted by the transmitter. When a request for retransmission of data is received from the receiver, in spite of an operation carried out at an IP layer, information available at the TCP layer is obtained and data corresponding to the encrypted data stored in the buffer is returned to the receiver in response to the request.

8 Claims, 15 Drawing Sheets

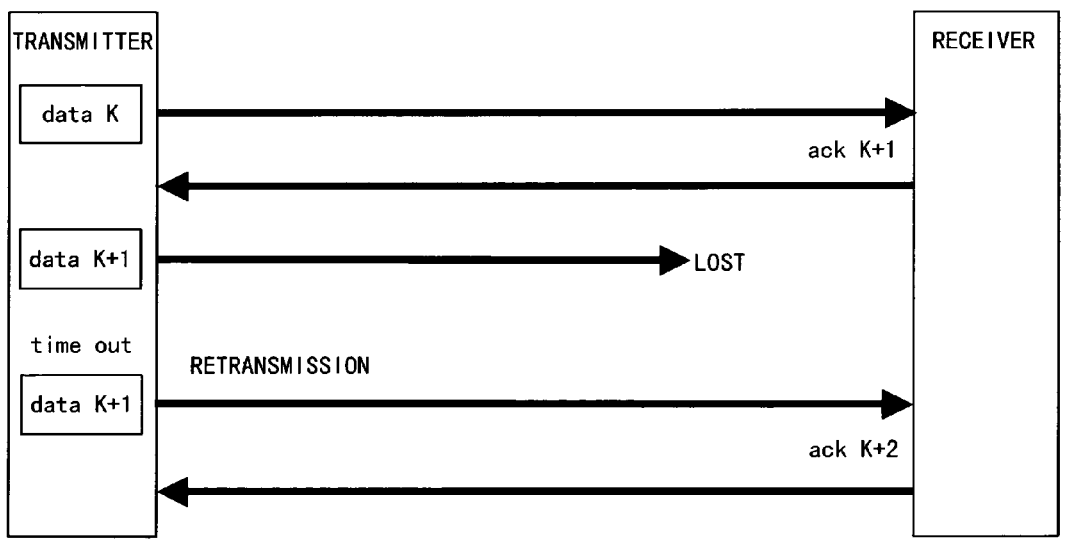
F I G. 1

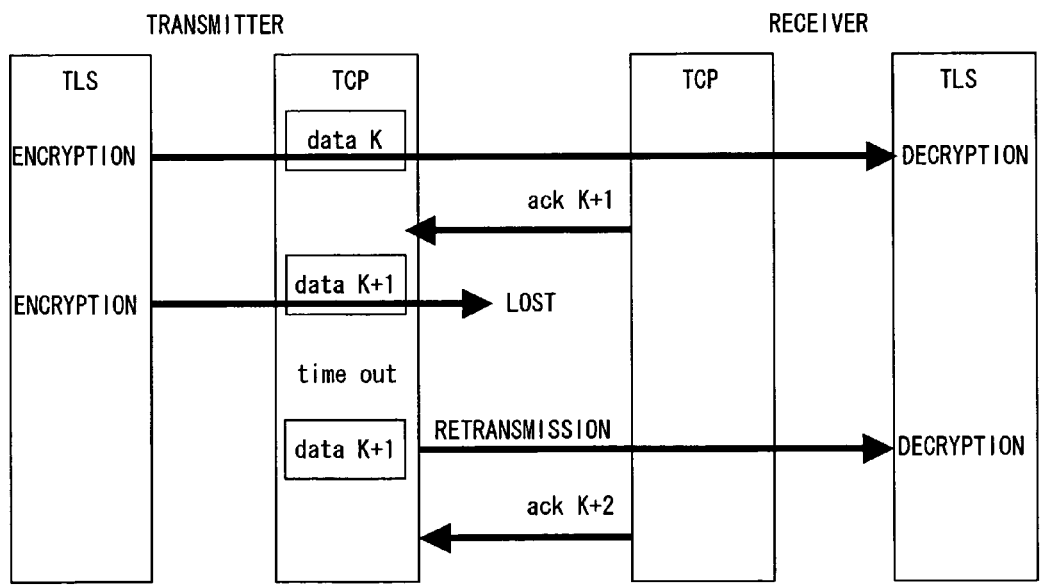
F I G. 3

| | TCP+IPSec | TLS |
|---|---|---|
| HIERARCHICAL LAYER FOR PREFORMING ENCRYPTION PROCESSING | NETWORK LAYER | TRANSPORT LAYER (ABOVE TCP) |
| HIERARCHICAL LAYER FOR PREFORMING RETRANSMISSION PROCESSING | TRANSPORT LAYER (TCP) | TRANSPORT LAYER (TCP) |
| PERFORMING RE-ENCRYPTION PROCESS OF RETRANSMITTED PACKET | REQUIRED (INCREASING THE LOAD AND THE PROCESSING TIME) | NOT REQUIRED (NOT INCREASING THE LOAD THE LOAD AND THE PROCESSING TIME) |
| OBJECT OF ENCRYPTED-DATA COMMUNICATION | ALL IP PACKETS | ONLY SESSIONS SELECTING TLS |
| APPLICATION FIELD | BROAD RANGE INCLUDING VPN | PARTIAL RANGE SUCH AS A SECRET http (https) |

FIG. 4

|   |   | PROTOCOL EXAMPLES |
|---|---|---|
| 7 | APPLICAITOIN LAYER |   |
| 6 | PRESENTATION LAYER |   |
| 5 | SESSION LAYER |   |
| 4 | TRANSPORT LAYER | TCP、TLS |
| 3 | NETWORK LAYER | IP、IPSec |
| 2 | LINK LAYER | IEEE 803.? |
| 1 | PHYSICAL LAYER |   |

F I G. 5

|  | byte0 | Byte1 | byte2 | byte3 |
|---|---|---|---|---|
| 0 | SOURCE PORT | | DESTINATION PORT | |
| 4 | SEQUENCE NUMBER | | | |
| 8 | ACKNOWLEDGEMENT NUMBER | | | |
| 12 | HLEN | RESERVED | FLAGS | WINDOW SIZE |
| 16 | TCP CHECKSUM | | URGENT OFFSET | |

F I G. 7

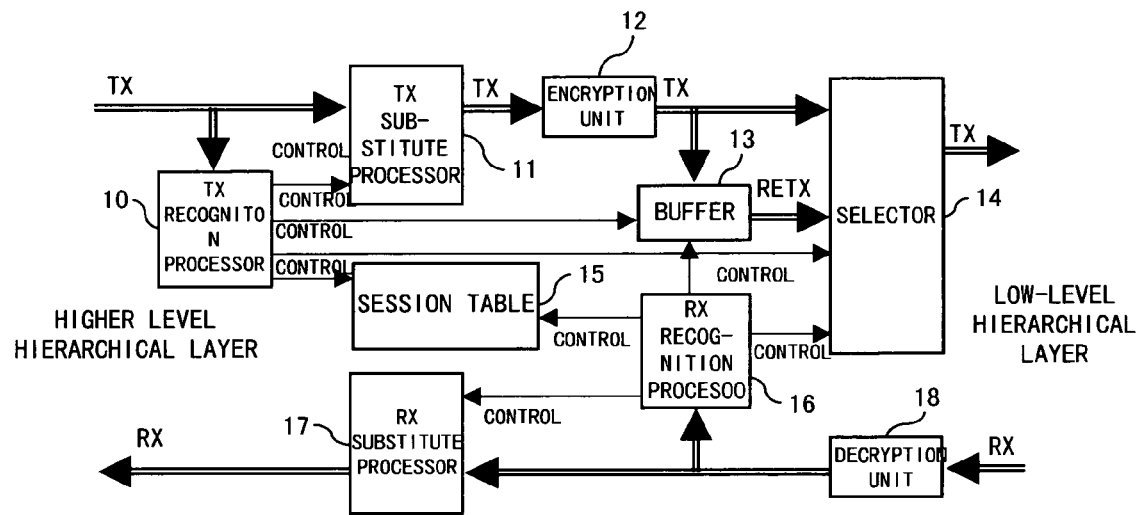
F I G. 8

| PROTOCOL | CHANGED-ITEM EXAMPLE | DESCRIPTION |
|---|---|---|
| TCP | FLAGS | AN Ack IS DROPPED |
| TCP | SEQUENCE NUMBER | THE SEQUENCE NUMBER IS CHANGED |
| TCP | ACKNOWLEDGEMENT NUMBER | THE ACKNOWLEDGEMENT NUMBER IS CHANGED |
| TCP | CHECKSUM | THE CHECKSUM IS CHANGED TO REFLECT A DATA CHANGE |

FIG. 9

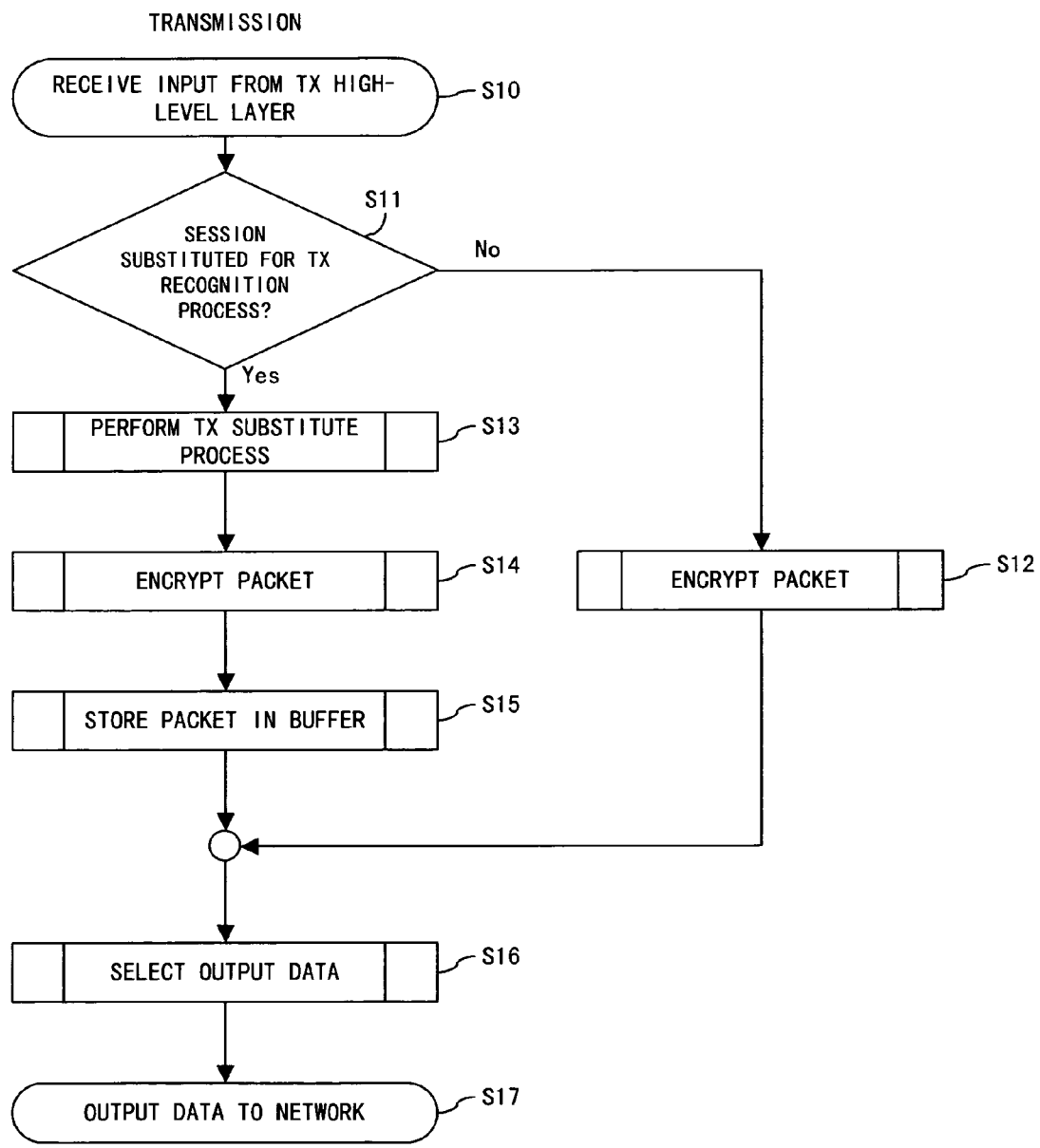
F I G. 10

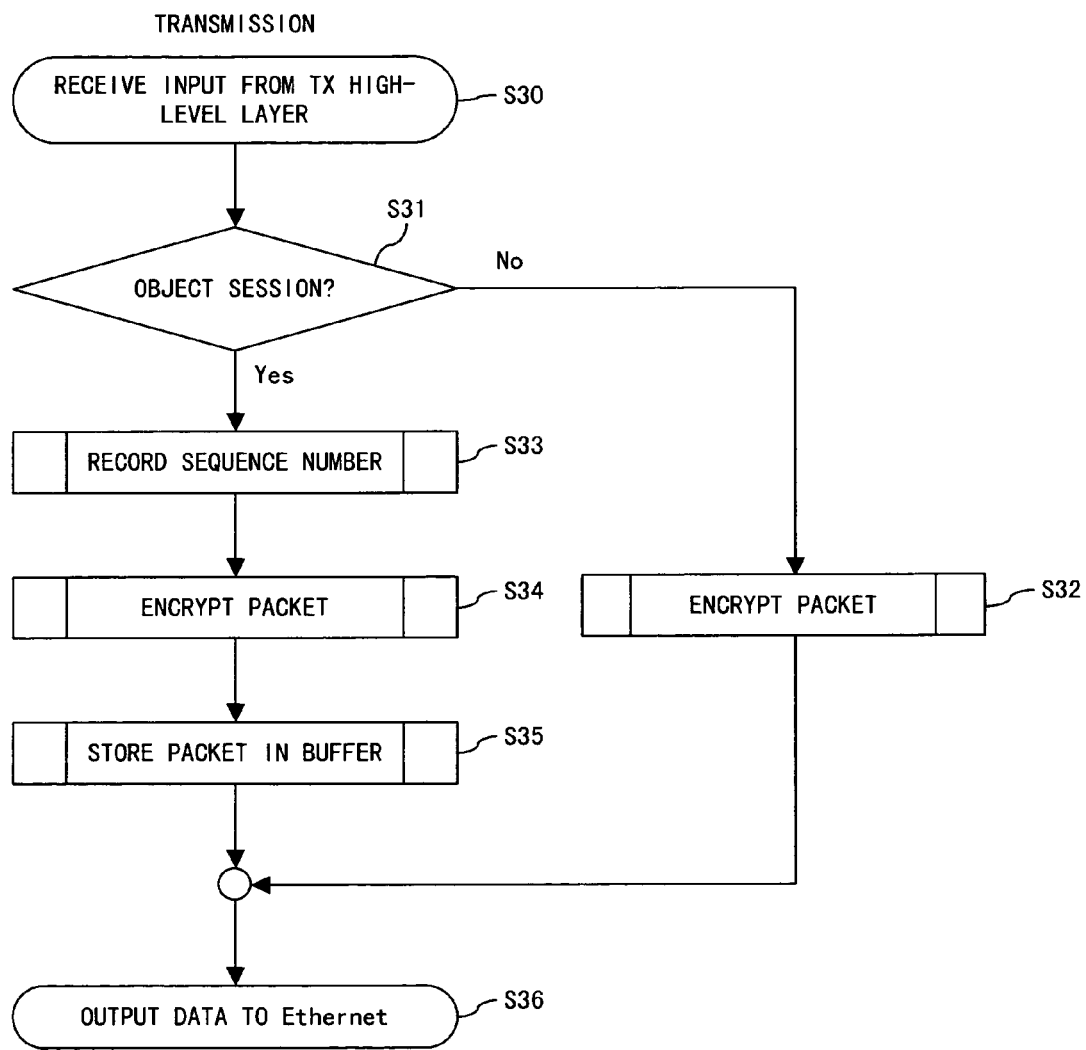
F I G. 12

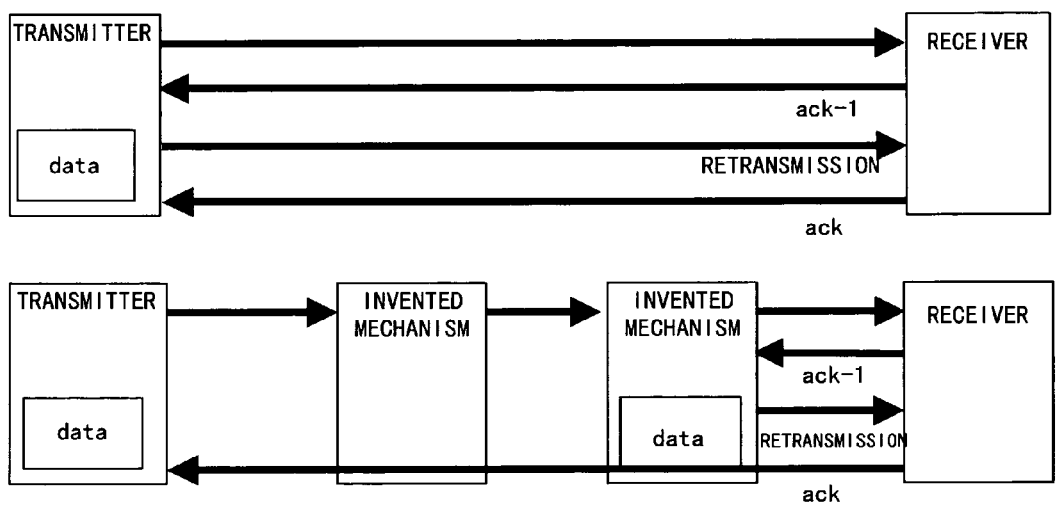
F I G. 15

COMMUNICATION-PROCESSING APPARATUS AND ITS METHOD

BACKGROUND OF THE INVENTION

1. Field of the Invention

The present invention relates to a communication-processing apparatus and its method.

2. Description of the Related Art

In communication, a function for communicating pieces of data between communicators without a data loss and data duplication while maintaining the order of the pieces of data is required. The technical term 'reliable communication' used in the following description means this communication.

In order to implement the reliable communication, as a rule, the receiver transmits an acknowledgement to a transmitter as a reception notice indicating that the receiver has received data with a high degree of reliability from the transceiver. The acknowledgement is properly abbreviated hereafter to Ack. The transmitter needs to retransmit the data if the transmitter does not receive such a reception notice. Determination as to whether or not data needs to be retransmitted in dependence on whether or not an Ack is received is referred to as retransmission control.

FIG. 1 is an explanatory diagram referred to in description of the retransmission control.

First of all, a transmitter transmits data K to a receiver. As the receiver receives the data K normally, the receiver transmits a reception notice Ack (K+1) to the transmitter to prompt the transmitter to transmit next data (K+1). When the transmitter receives the reception notice Ack (K+1), the transmitter transmits the data (K+1) to the receiver. Assume that the data (K+1) is lost in the course of the transmission through a communication transmission line. In this case, the receiver will not receive the data (K+1) no matter how long time lapses. Thus, the receiver cannot transmit an Ack. Since the transmitter does not receive the Ack, time measured by counting started right after the transmission of the data (K+1) reaches a timeout value. When the transmitter determines that the transmitter has entered a timeout state, the transmitter determines that the data (K+1) has been lost. In this case, the transmitter retransmits the data (K+1) to the receiver. If the receiver receives the data (K+1) normally, the receiver transmits an Ack (K+2).

The following 2 representative methods are representative conventional means for implementing reliable encrypted-data communication.
A): A method of using a TCP and an IPSec at the same time.
B): A method of using TLS (Transport Layer Security), which is also referred to as SSL.

In method (A) of using a TCP and an IPSec at the same time, the TCP implements the reliable communication. Thus, when a packet is lost, the TCP is the function in charge of execution of retransmission control, which is control to retransmit the lost packet. In order to execute normal retransmission control, a TCP on the transmitter side transmits data and a TCP on the receiver side transmits an Ack packet to the TCP on the transmitter side every time the TCP on the receiver side receives data. When the TCP on the transmitter side receives an Ack packet, the Ack packet can be regarded as a packet indicating that the TCP on the receiver side recognizes the received data. If the data is lost, the data is retransmitted to replace the lost data.

FIG. 2 is an explanatory diagram referred to in description of a communication in which a TCP and an IPSec are used at the same time.

When the TCP transmits a retransmission packet in accordance with method (A), the IPSec must carry out processing to encrypt the retransmission packet in spite of the fact that the data of the packet was encrypted before, and transmits the retransmission packet to the receiver by way of a network. This is because, the TCP on a high-level hierarchical layer in the hierarchical structure of the protocol and the IPSec on a low-level hierarchical layer in the same structure are defined to operate without cooperation at all. In general, processing carried out by the IPSec is a complicated process. Thus, if the processing is carried out on the same data several times, the processing will raise a problem of an excessively heavier load an excessively longer processing time. Examples of the processing carried out by the IPSec are an encryption process and an authentication process.

FIG. 3 is an explanatory diagram referred to in description of communication adopting a TLS method.

The TLS method ((method (B)) is a method of carrying out an encryption process at a high-level hierarchical layer of the TCP. In this case, since the TCP receives data in an encrypted state from the high-level hierarchical layer, the TCP does not need to carry out an encryption process on data even if the data is to be retransmitted.

As a summary of the above description, in encrypted-data communication requiring retransmission of data for some cases, from a standpoint of elimination of encryption processing at a retransmission time, the TLS method is superior to the (TCP+IPSec) method. Since the IPSec offers a merit of a capability of encrypting data not only in the TCP but also in all communications, however, this method is frequently used in actual operations.

FIG. 4 shows a table comparing the TLS method with the (TCP+IPSec) method.

As is obvious from the table, the TLS method is adopted in a narrow application field such as a secret http. On the other hand, the (TCP+IPSec) method is adopted in a wide field including a VPN. However, the (TCP+IPSec) method requires a re-encryption process for a retransmitted packet, increasing the processing load and the processing time. In the case of the TLS method, on the other hand, the re-encryption process for a retransmitted packet is not required, resulting in neither increase in processing load nor increase in processing time. Thus, the TLS method is suitable for high-sped communication. For this reason, in order to maintain the wide application range of the (TCP+IPSec) method and to carry out high-speed communications, it is obvious that the problem of the re-encryption process for a retransmitted packet must be solved.

Patent Reference 1 discloses a conventional technology whereby, by executing a control-message retransmission function on layer 3, an error caused by a fault at the level of layer 2 is recovered. Patent Reference 2 also discloses a technology whereby, on layer 3, an error caused by a fault at the level of layer 2 is recovered. Patent Reference 3 discloses a technology whereby, in a multicast transfer, a transmitting station polls receiving stations. Patent Reference 4 discloses a technology whereby redundancy is eliminated in a multicast transfer. Patent Reference 5 discloses a system wherein a tentative response for acknowledging reception is transmitted.

Patent Reference 1: Japanese Patent Laid-open No. Hei 5-183644
Patent Reference 2: Japanese Patent Laid-open No. Hei 5-122278
Patent Reference 3: Japanese Patent Laid-open No. Hei 11-196041

Patent Reference 4: Japanese Patent Laid-open No. 2001-237883

Patent Reference 5: Japanese Patent Laid-open No. 2002-247132

That is, in the conventional method, the use of the IPSec having a wide application field in implementation of reliable communication such as the communication based on the TCP or the like raises a problem of a heavier processing load and a longer processing time due to a process to re-encrypt a retransmitted packet.

In the present invention, as is obvious from the (TCP+IPSec) example, by reducing the amount of whole processing when a reliable communication is processed at a high-level hierarchical layer whereas an encrypted-data communication is processed at a low-level hierarchical layer, the processing load can be decreased while the processing performance can be enhanced.

In addition, if retransmission processing can be carried out at a lower-level hierarchical layer such as an IP layer also when only reliable communication is carried out without using encrypted-data communication, transmission reaching a high-level hierarchical layer such as the TCP station is no longer required. Thus, the number of labor hours required for transmitting data between high-level and low-level hierarchical layers can be reduced.

SUMMARY OF THE INVENTION

The object of the present invention addressing the problems described above is to provide a technology for making communication processing more efficient by carrying out a portion of the communication processing of the high-level hierarchical layer at a low-level hierarchical layer.

The communication-processing apparatus provided by the present invention is a communication-processing apparatus for carrying out a communication including retransmission control, which is carried out at a high-level hierarchical layer, at a low-level hierarchical layer including: high level hierarchical layer data acquisition means for acquiring information on a data communication terminated at the high-level hierarchical layer from data received from a network at the low-level hierarchical layer without carrying out processing for the termination at the high-level hierarchical layer; and retransmission means for outputting data being retransmitted on the basis of the acquired information at the low-level hierarchical layer.

The communication-processing method provided by the present invention is a communication-processing method for carrying out a communication including retransmission control, which is carried out at a high-level hierarchical layer, at a low-level hierarchical layer including: a high level hierarchical layer data acquisition step of acquiring information on a data communication terminated at the high-level hierarchical layer from data received from a network at the low-level hierarchical layer without carrying out processing for termination at the high-level hierarchical layer; and a retransmission step of outputting data being retransmitted on the basis of the acquired information at the low-level hierarchical layer.

In the present invention, information on a data communication terminated at the high-level hierarchical layer is merely extracted from data such as a request for retransmission of data at the low-level hierarchical layer and interpreted without carrying out processing for termination at the high-level hierarchical layer. In the case of a request for retransmission of data, the data is output directly from the low-level hierarchical layer.

In accordance with the present invention, by carrying out processing of the high-level hierarchical layer at a low-level hierarchical layer, communication processing can be carried out with a higher degree of efficiency at a high speed so that efficient high-speed communication can be implemented.

BRIEF DESCRIPTION OF THE DRAWINGS

FIG. 1 is an explanatory diagram referred to in description of the concept of retransmission control;

FIG. 3 is an explanatory diagram referred to in description of a TLS method;

FIG. 4 shows a table for comparing the TLS method with a (TCP+IPSec) method;

FIG. 5 is a diagram showing hierarchical layers composing an OSI model of 7 hierarchical layers;

FIG. 7 is a diagram showing a TCP packet header;

FIG. 8 is a diagram showing an overall configuration of the first embodiment of the present invention;

FIG. 9 shows a table showing how a change is added to the packet;

FIG. 10 shows part 1 of a flowchart representing operations in the entire configuration;

FIG. 12 shows part 1 of a flowchart representing packet processing;

FIG. 15 is an explanatory diagram showing a second embodiment of the present invention.

DESCRIPTION OF THE PREFERRED EMBODIMENTS

Figure 2:
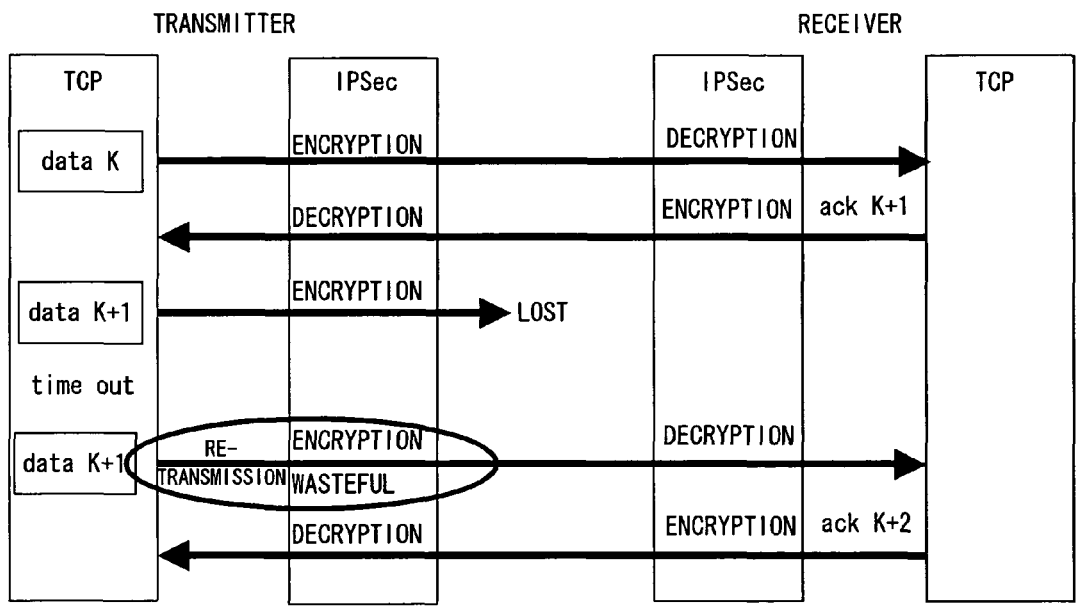
FIG. 2 is an explanatory diagram referred to in description of a communication using a TCP and an IPSec at the same time.

In a communication system implemented by an embodiment of the present invention as a communication system having a plurality of protocol hierarchical layers, a communication packet exchanged by a high-level hierarchical layer is subjected to substitute processing carried out by a processing apparatus on a low-level hierarchical layer in order to implement reduction of the processing amount and enhancement of the processing performance.

The range of application fields of the processing apparatus implemented by the embodiment of the present invention is very wide. A concrete one of the application fields is a field in which 'reliable communication' and 'encrypted-data communication' need to be carried out at the same time. Another concrete one of the application fields is a general communication field in which 'reliable communication' is carried out.

In this case, a high-level hierarchical layer is generally a hierarchical layer placed at a relatively high level in an OSI model of 7 protocol hierarchical layers. On the other hand, a low-level hierarchical layer is generally a hierarchical layer placed at a relatively low level in the OSI model of 7 protocol hierarchical layers. In actual implementation of a communication protocol, a high-level hierarchical layer is defined as a hierarchical layer closer to an application program from a data-flow point of view. On the other hand, a low-level hierarchical layer is defined as a hierarchical layer farther from the application program from the data-flow point of view.

FIG. 5 is a diagram showing hierarchical layers composing the OSI model of 7 hierarchical layers.

The highest-level hierarchical layer or the 7th hierarchical layer is an application layer. The 6th hierarchical layer is a presentation layer and the 5th hierarchical layer is a session layer. The 4th hierarchical layer is a transport layer for implementing TCP and TLS protocols and the 3rd hierarchical layer is a network layer, which is a hierarchical layer for implementing the IP and IPSec protocols. The 2nd hierarchical layer is a link layer, which is a hierarchical layer for a protocol of the 803 series of the IEEE. The lowest hierarchical layer is a physical layer.

In this specification, the present invention is applied to 'reliable encrypted-data communication' and 'reliable communication'. However, the scope of the present invention is not limited to these typical applications.

First of all, as an example showing an easily understandable effect of the present invention, 'reliable communication' is implemented at a high-level hierarchical layer, and a low-level hierarchical layer is used as a layer in charge of 'encrypted-data communication'. In this case, a means for implementing 'reliable encrypted-data communication' with a high degree of efficiency is exemplified, being followed by exemplification of a means for implementing 'reliable communication' with a high degree of efficiency. In the description of this specification, a protocol of the Internet is used in order to make the explanation concrete. However, the scope of the present invention is not limited to the protocol of the Internet. In addition, while a packet communication technology is described as a topic, the present invention can also be applied to non-packet communication as well.

It is to be noted that the 'reliable communication' is defined as communication neither losing any piece of data transmitted between communicators in the course of communication nor introducing duplication of data and maintaining the original order of the pieces of data. This function is an absolutely required function. The TCP (Transmission Control Protocol) adopted in the Internet is a representative communication method adopted at the transport layer as a communication method for implementing 'reliable communication'.

In addition, the function to implement encrypted-data communication for preventing data exchanged between communicators from being stolen and interpolated by a third party is also an important function. The IPSec adopted in the Internet is a representative communication method adopted at the network layer as a communication method for implementing 'encrypted-data communication'.

Figure 6:
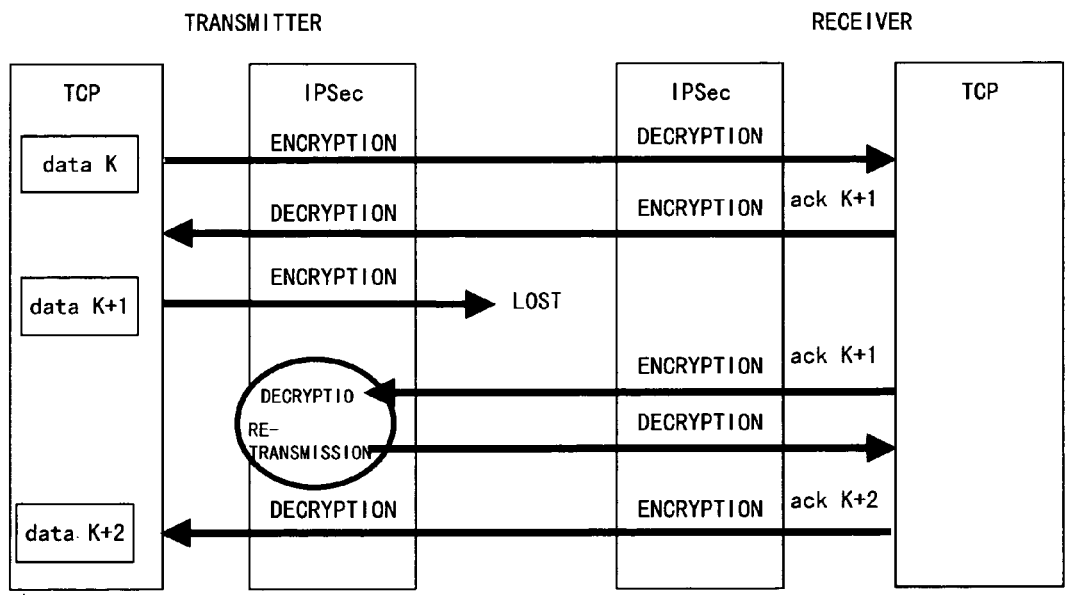
FIG. 6 is an explanatory diagram showing a first embodiment of the present invention.

In an embodiment of the present invention, contents of a packet are examined at a low-level hierarchical layer and, if a predetermined condition is satisfied, on behalf of a high-level hierarchical layer supposed to carry out processing on the packet, a process is carried out at the low-level hierarchical layer as a substitute for the processing. FIG. 6 is an explanatory diagram showing the first embodiment.

The transmitter and the receiver each comprise a portion for executing the TCP protocol and a portion for executing the IPSec. The portion for executing the TCP protocol and the portion for executing the IPSec can be implemented in a computer or implemented by different computers.

First of all, data K is transmitted from the TCP unit employed in the transmitter to the receiver as shown in FIG. 6. Prior to the transmission, the IPSec unit employed in the transmitter encrypts data K. The IPSec unit employed in the receiver then receives and decrypts data K. Then, decrypted data K is supplied to the TCP unit employed in the receiver. As the TCP unit employed in the receiver receives data K, Ack (K+1) is transmitted to the transmitter. Prior to the transmission, the IPSec unit employed in the receiver encrypts Ack (K+1). The IPSec unit employed in the transmitter receives and decrypts Ack (K+1), delivering decrypted Ack (K+1) to the TCP unit employed in the transmitter. The TCP unit employed in the transmitter transmits data (K+1) to the receiver. Prior to the transmission, the IPSec unit employed in the transmitter encrypts data (K+1) and outputs the data to a transmission line. However, the TCP unit employed in the receiver does not receive data (K+1) output to the transmission line no matter how long time lapses. Thus, Ack (K+1) is transmitted again to the transmitter. This time, Ack (K+1) is transmitted to the transmitter to prompt the transmitter to retransmit data (K+1). The IPSec unit employed in the transmitter decrypts Ack (K+1), interpreting this ack as a message making a request for transmission of data (K+1) of the TCP layer. As this ack is known to be a request for transmission of data (K+1), the IPSec unit employed in the transmitter transmits a packet containing encrypted data (K+1) stored in a buffer to the receiver. As the TCP unit employed in the receiver receives encrypted data (K+1) from the IPSec unit employed in the transmitter, the TCP unit employed in the receiver outputs Ack (K+2).

An embodiment described below is an embodiment of the present invention in the TCP unit and the IPSec unit. In the embodiment, a specific function is applied to the IPSec layer. A high-level-hierarchical layer is a TCP layer and a low-level hierarchical layer is a network layer such as the Ethernet (a trademark).

FIG. 7 is a diagram showing a TCP packet header.

In this embodiment, the format of the packet header shown in FIG. 7 comprises SEQUENCE NUMBER, ACKNOWLEDGMENT NUMBER, FLAGS and TCP CHECKSUM. FLAGS includes information indicating whether Ack>ACKNOWLEDGMENT NUMBER of the acknowledgement is valid or invalid.

FIG. 8 is a diagram showing an overall configuration of the first embodiment of the present invention.

An apparatus implemented by this embodiment of the present invention is positioned between the high-level hierarchical layer and the low-level hierarchical layer. The apparatus receives data TX from the high-level hierarchical layer and transfers data TX to the low-level hierarchical layer. On the other hand, the apparatus receives data RX from the low-level hierarchical layer and transfers data RX to the high-level hierarchical layer. This embodiment of the present invention has a TX recognition processor 10 and a TX substitute processor 11, which are provided on the TX side. The embodiment also includes a RX recognition processor 16 and a RX substitute processor 17, which are provided on the RX side. A session table 15 is used for storing information on a session naturally to serve as a processing object in a recognition process and information on a session actually serving as a processing object in a recognition process. The information on a session actually serving as a processing object includes a most recent sequence number and a most recent acknowledgment number. A buffer 13 is used for saving a transmitted packet for a retransmission purpose.

The following description explains a basic flow of IPSec processing to which the embodiment of the present invention is applied with the TCP used as a high-level hierarchical layer and the Ethernet (a trademark) used as a low-level hierarchical layer.

First of all, the TX recognition processor 10 recognizes a TX packet received from the TCP layer and identifies a TCP session to serve as a processing object. If the received packet is a data transmission packet, the sequence number is cataloged as session information. After the packet is encrypted by the encryption unit 12, the packet is then output to the Ethernet (a trademark) by way of a selector 14 and saved in the buffer 13.

On the other hand, the decryption unit 18 first decrypts an RX packet from the Ethernet (a trademark) to produce a clear text, which is then analyzed by the RX substitute processor 17. In the analysis, an acknowledgement number is examined to determine whether or not retransmission is required. If retransmission is required, a packet stored in the buffer 13 as a packet of this session is retransmitted by way of the selector 14. If the RX packet causing the retransmission is an acknowledge packet, that is, a TCP packet containing no data, the packet is discarded in substitute processing. That is, the packet is not transferred to the high-level hierarchical layer. The processing is referred to as substitute processing since the processing is a substitute for a retransmission process, which should be naturally carried out at the high-level hierarchical layer. If the RX packet is an acknowledge packet containing data, on the other hand, an ACK bit included in FLAGS of the TCP header is reset and the packet is transferred to the high-level hierarchical layer. The ACK bit is reset by setting the bit at 0.

If a packet less recent than that indicated by the acknowledgement number is stored in the buffer 13, the packet is deleted from the buffer 13. This is because the deleted packet has been received by the receiver and does not need to be retransmitted.

As a modified implementation of the retransmission method, the RX packet is transferred to the high-level hierarchical layer without changing the packet and a retransmission packet from the TCP layer is transferred. If a packet to be retransmitted is received from the high-level hierarchical layer, the sequence number of the packet is examined to determine whether or not the packet is the same as a packet transmitted in the past. If the TX packet received from the high-level hierarchical layer is the same as a packet transmitted in the past, the TX packet is discarded and the packet stored in the buffer 13 can be retransmitted. In this case, an encryption process for the TX packet received from the high-level hierarchical layer does not need to be carried out.

In recognition processing, the contents of a packet are analyzed in accordance with a predetermined recognition standard. The result of the analysis may activate a substitute process to be carried out on the packet or a plurality of substitute processes to be carried out on the packet sequentially or concurrently. As an alternative, the result of the analysis may not necessitate application of any substitute processes to the packet.

The recognition processing comprises operations carried out by the TX recognition processor 10 and the RX recognition processor 16. In the operations, the contents of a packet are analyzed to determine whether or not the packet is a packet to serve as an object of a substitute process. At the TCP layer, a packet pertaining to a TCP session to serve as a processing object is a packet to serve as an object of a substitute process.

As a recognition standard, a means using one combination or a plurality of combinations is provided. Each of the combinations is a combination of pieces of information included in the packet header. The pieces of information included in the packet header include the type of the protocol set in advance, addresses of the packet and port numbers. The protocol number represents the type of the protocol set in advance.

At the TCP layer, by examining an IP-address pair, port numbers and the protocol of the IP header, a specific TCP session can be recognized. The IP-address pair consists of a source IP address and destination IP address of the TCP header. The port numbers are numbers assigned to source and destination ports of the TCP header.

As a recognition standard, recognition information separated from a packet described above can be used. The recognition information is provided from the high-level hierarchical layer by adding data showing the recognition standard to original data.

This method determined in advance is a method adopted for example for a case in which additional data is added to original communication data in an operation to transfer the communication data from the high-level hierarchical layer, and the additional data is analyzed. As a recognition standard, a state of communication at the low-level hierarchical layer can also be used.

In this case, the state of communication is typically a state of transmitting data, to destinations ranging from the low-level hierarchical layer to a communication partner. If no data is lost, by reducing the mechanism provided by the embodiment of the present invention, an object to decrease the number of substitute processes, the processing load of the substitute processes and the processing time can be achieved.

As a means of a substitute process, the buffer 13 for buffering packets is provided. In this case, all packets are entirely put in a sequence before being buffered.

The packets are classified as packets having the same type like for example packets of a TCP session. The packets are then put in a sequence for every classified packet before being buffered. At the TCP layer, the order of packets is determined by use of a sequence number. A packet length and packet sequence of a packet, can be used for determining whether or not data has been lost from the packet. By use of these pieces of information, packets are entirely put in a sequence before being buffered.

As a substitute process, the packet is partially changed. That is, the packet is partially changed appropriately for the purpose of replacing retransmission control.

FIG. 9 shows a table showing how a change is added to the packet.

When a TCP packet is transmitted, for example, by examining the TCP acknowledgement number, the sequence number of transmitted data requested by the receiver can be identified. If the data has been stored in a buffer, on behalf of the TCP layer, the packet can be transmitted from the buffer to the receiver. At that time, even if a received packet is transferred to the TCP layer as it is, the TCP layer will also execute retransmission control. It is thus necessary to change the acknowledgement number of the received packet to be transferred to the TCP layer to the acknowledgement number of a packet transmitted by the TCP layer most recently.

As another substitute process, there is processing to delete or discard the packet and not to relay the packet. In addition, a buffered packet related to the deleted packet is transmitted to the receiver. That is, at a retransmission time, the buffered packet is transmitted to the receiver.

As an alternative, a buffered packet related to the packet is deleted. That is, since it is not necessary to retransmit a packet for which an Ack has been received from the receiver, the buffered packet is deleted.

In this case, processing is carried out to create a new packet related to the packet. For example, an ACK packet of the TCP is created and transmitted to the receiver on behalf of the TCP layer.

In addition, processing to prevent an overflow from occurring in the buffer is necessary. When the buffer is full, the transmitter is informed that the buffer is full, requiring that transmission of packets be suppressed so that no overflow will occur in the buffer. Means for informing the transmitter are explained as follows. The transmitter can be informed that the buffer is full so that transmission of packets needs to be suppressed by suppressing the operation to return ACK packets at the TCP layer. If supported by the transmitter, the transmitter can be notified by an ECN. At the IP layer, the transmitter can be notified by ICMP Source Quench. At the Ether layer, the transmitter can be notified by use of a PAUSE frame.

Figure 11:
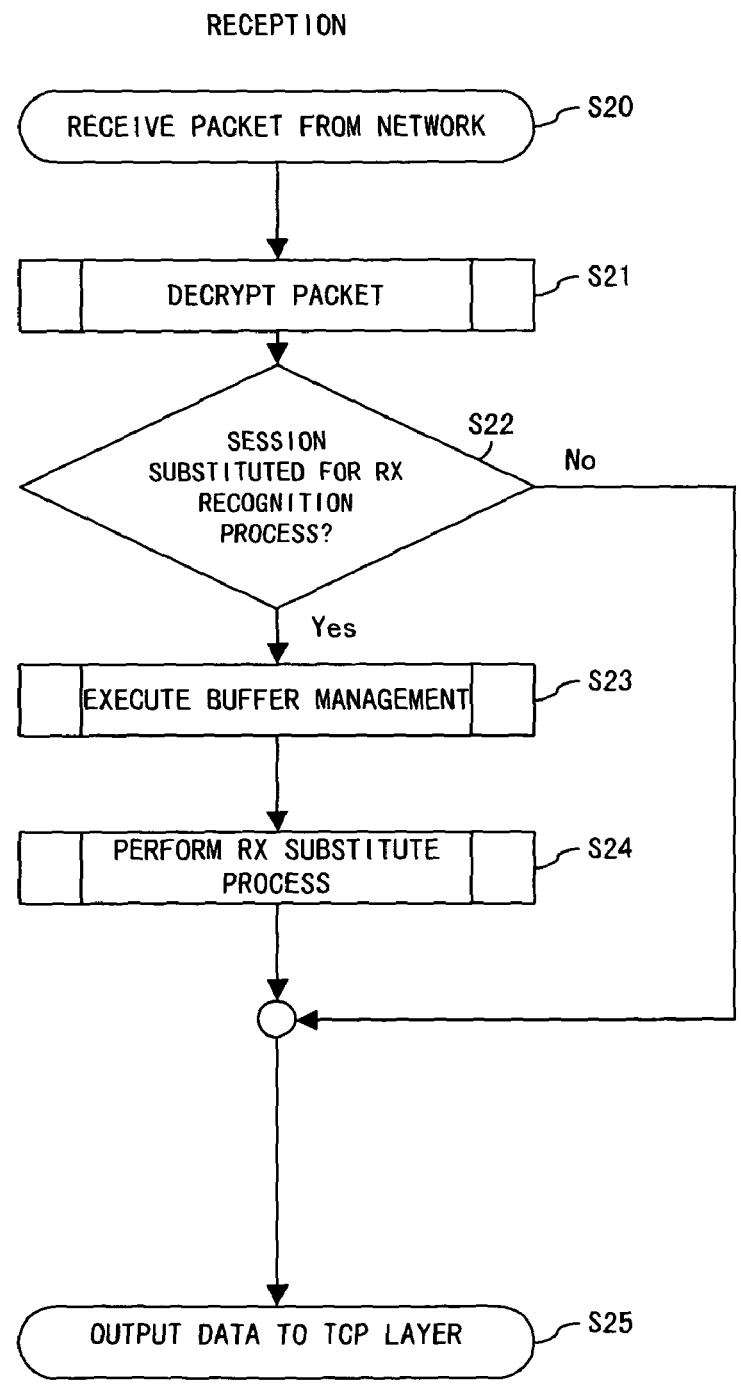
FIG. 11 shows part 2 of the flowchart representing operations in the entire configuration.

FIGS. 10 and 11 show flowcharts of the entire configuration.

To be more specific, the flowchart shown in FIG. 10 represents processing carried out by the transmitter. The flowchart begins with a step S10 at which an input is received from the TX high-level hierarchical layer. Then, the flow of the processing goes on to a step S11 to determine whether or not the session in TX recognition processing is a session of a substitute process. If the determination result obtained at the step S11 is NO, the flow of the processing goes on to a step S12 at which the packet is encrypted. Then, the flow of the processing goes on to a step S16. If the determination result obtained at the step S11 is YES, on the other hand, the flow of the processing goes on to a step S13 at which a TX substitute process is carried out. Then, at the next step S14, the packet is encrypted and, at the next step S15, the encrypted packet is stored in a buffer. Subsequently, at the next step S16, data to be output is selected. Finally, at the next step S17, the selected data is output to a network.

On the other hand, the flowchart shown in FIG. 11 represents processing carried out by the receiver.

The flowchart begins with a step S20 at which data is received from the network. Then, at the step S21, the packet containing the received data is decrypted. Subsequently, the flow of the processing goes on to a step S22 to determine whether or not this session is a session in which the RX recognition processing is a substitute process. If a determination result obtained at the step S22 is NO, the flow of the processing goes on to a step S25. If a determination result obtained at the step S22 is YES, on the other hand, the flow of the processing goes on to a step S23 at which buffer management is executed and, at the next step S24, an RX substitute process is carried out before the flow of the processing goes on to the step S25. At the step S25, the data is output to the TCP layer.

Figure 13:
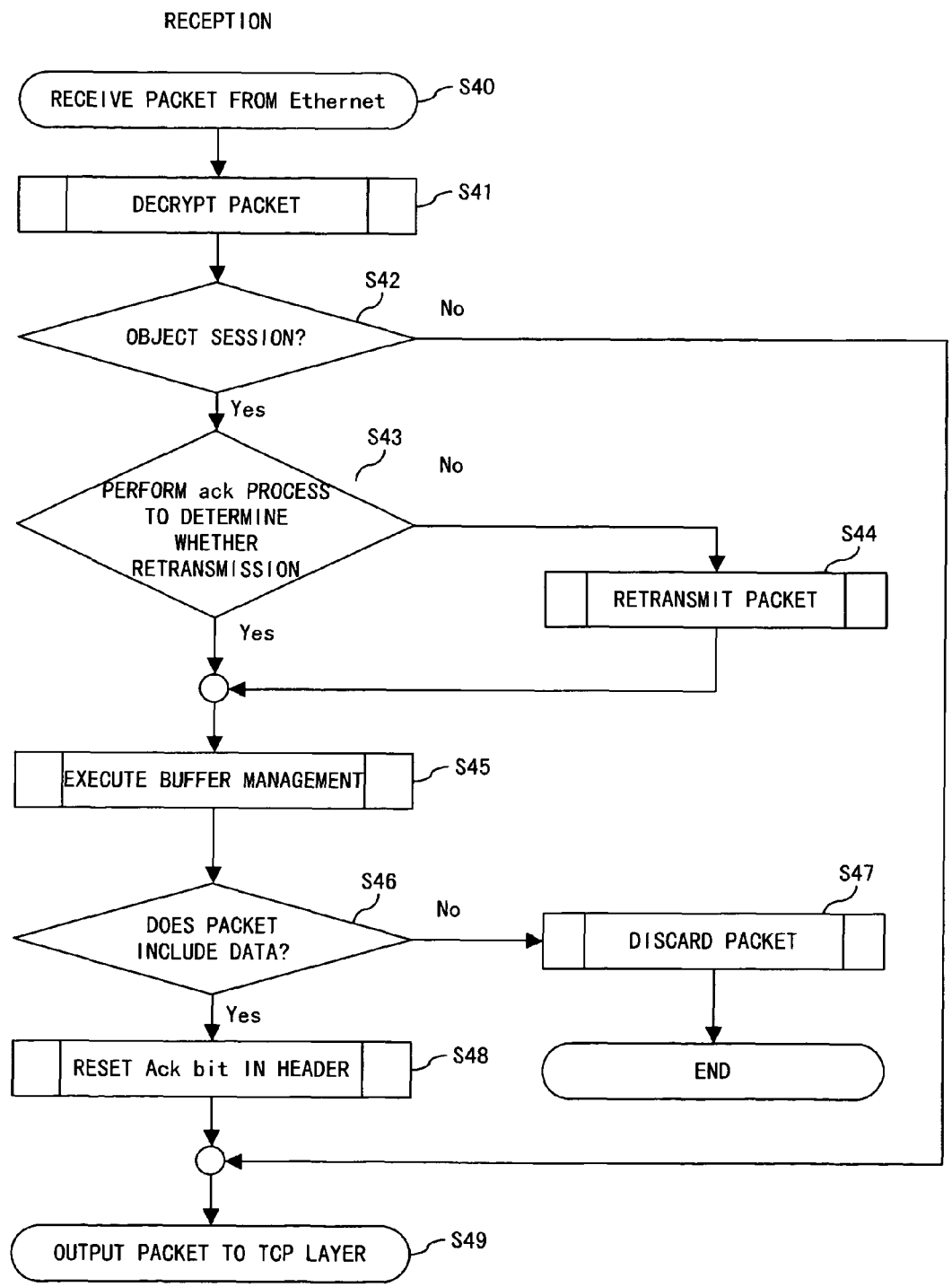
FIG. 13 shows part 2 of the flowchart representing packet processing.

FIGS. 12 and 13 show flowcharts representing packet processing.

To be more specific, the flowchart shown in FIG. 12 represents packet processing carried out by the transmitter.

This flowchart begins with a step S30 at which an input is received from the TCP layer. Then, the flow of the processing goes on to a step S31 to determine whether or not this session is an object session of a substitute process. If a determination result obtained at the step S31 is NO, the flow of the processing goes on to a step S32 at which a packet of the input is encrypted. Then, the flow of the processing goes on to a step S36. If a determination result obtained at the step S31 is YES, on the other hand, the flow of the processing goes on to a step S33 at which a sequence number is recorded. Then, at the next step S34, the packet is encrypted. Subsequently, at the next step S35, the encrypted packet is stored in a buffer. Then, at the next step S36, the encrypted packet is output to the Ethernet (a trademark).

On the other hand, the flowchart shown in FIG. 13 represents packet processing carried out by the receiver.

The flowchart begins with a step S40 at which data is received from the Ethernet (a trademark). Then, at the next step S41, the packet of the data is decrypted. Subsequently, the flow of the processing goes on to a step S42 to determine whether or not this session is an object session of a substitute process. If a determination result obtained at the step S42 is NO, the flow of the processing goes on to a step S49. If a determination result obtained at the step S42 is YES, on the other hand, the flow of the processing goes on to a step S43 at which an Ack process is carried out to determine whether or not a retransmission process is necessary. If a determination result obtained at the step S43 is NO, the flow of the processing goes on to a step S45. If a determination result obtained at the step S43 is YES, on the other hand, the flow of the processing goes on to a step S44 at which a packet is retransmitted. Subsequently, at the next step S45, a buffer process is carried out. Then, the flow of the processing goes on to a step S46 to determine whether or not the received packet contains data. If a determination result obtained at the step S46 is NO, the flow of the processing goes on to a step S47 at which the packet is discarded. If a determination result obtained at the step S46 is YES, on the other hand, the flow of the processing goes on to a step S48 at which an ACK bit included the header of the packet is reset. Then, at the next step S49, the packet is transferred to the TCP layer. The ACK bit is reset by setting the bit at 0.

Figure 14:
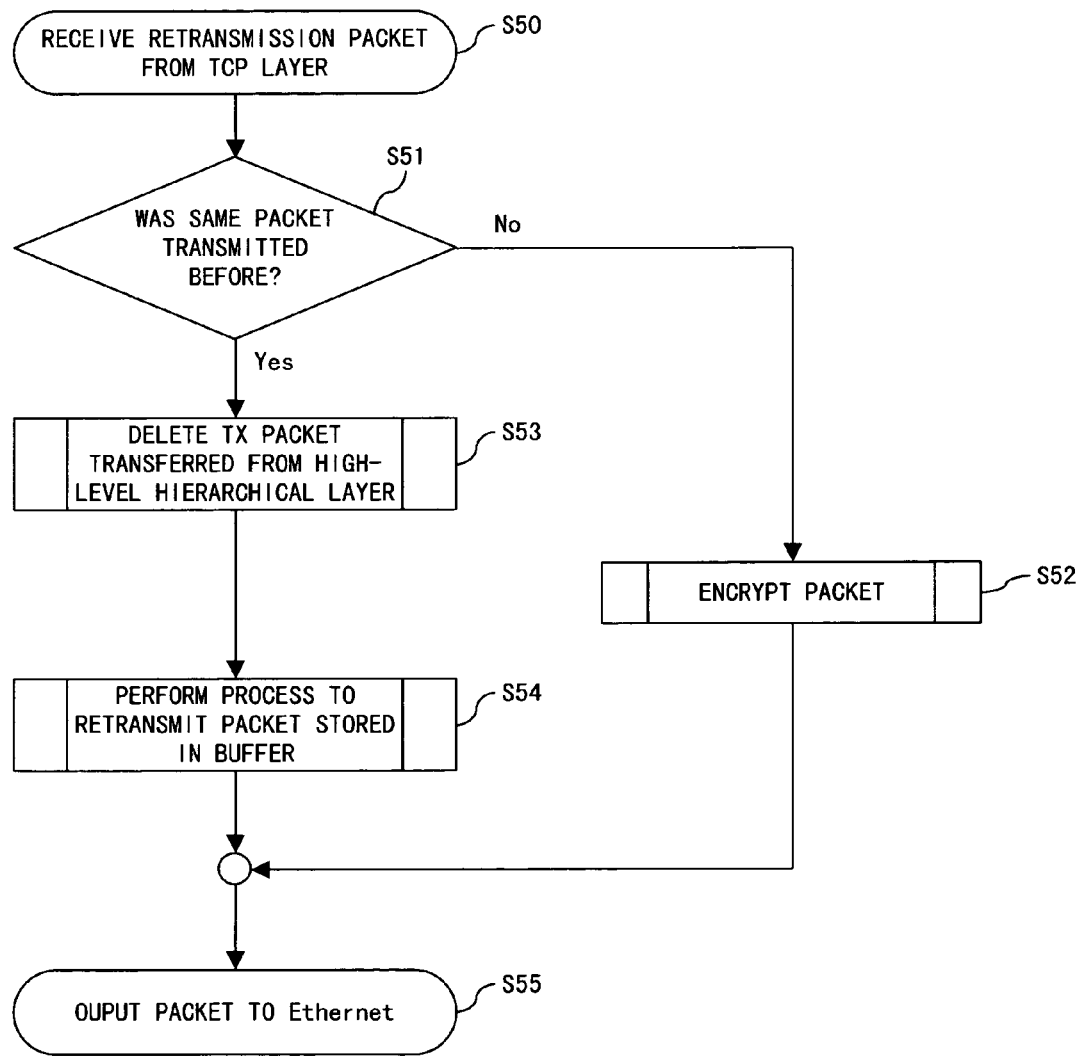
FIG. 14 shows a flowchart referred to in explanation of a typical modified implementation of retransmission processing.

FIG. 14 shows a flowchart referred to in explanation of a typical modified implementation of the substitute process.

The flowchart begins with a step S50 at which a retransmission packet is received from the TCP layer. Then, the flow of the processing goes on to a step S51 to determine whether or not the same packet has been transmitted to the receiver in the past. If a determination result obtained at the step S51 is NO, the flow of the processing goes on to a step S52 at which the packet is encrypted and the flow goes on to a step S55. If a determination result obtained at the step S51 is YES, on the other hand, the flow of the processing goes on to a step S53 at which a TX packet received from the high-level hierarchical layer is deleted. Then, at the next step S54, a process is carried out to retransmit a packet stored in a buffer. Subsequently, at the next step S55, the packet is output to the Ethernet (a trademark).

FIG. 15 is an explanatory diagram showing a second embodiment of the present invention.

The first embodiment has been explained on the assumption that encryption processing for the case of the IPSec is carried out. However, the mechanism of the first embodiment can also be applied to a case in which the encryption processing is not carried out. An example of the case in which the encryption processing is not carried out is a case for performing IP processing. In this embodiment, processing to raise an ACK packet received from an IP layer to a high-level hierarchical layer is carried out. Then, at the high-level hierarchical layer, processing is carried out to analyze the ACK packet, regenerate a packet to be retransmitted and transfer the packet to be retransmitted to the low-level hierarchical layer. However, no encryption processing is included. It is expected that, in the case of the second embodiment, the processing load and the processing time can be further reduced even if the encryption processing is not taken into consideration provided that the retransmission processing at the high-level hierarchical layer and exchanges of packets between the high-level and low-level hierarchical layers can be eliminated.

In addition, the mechanism of this embodiment allows paths propagating a packet to be provided at a plurality of locations. To put it concretely, at such locations, a transmitter, a receiver and a plurality of network apparatus are provided. In such a configuration, a network apparatus in the mid of a path on the receiver side is capable of analyzing an ACK packet, determining whether or not its own buffer contains a packet to be retransmitted in the case a result of the analysis indicates that retransmission of the packet is necessary and retransmitting the packet if the packet is found in the buffer. The packet to be retransmitted can be a packet of encrypted-data communication or a packet of ordinary communication. By adoption of such a method, the receiver receives a retransmitted packet from a location closer to the receiver than the transmitter is. Thus, the retransmitted packet can be received in a short period of time in comparison with a packet retransmitted by the transmitter, which is the natural generator of the packet.

That is, what is shown in FIG. 15 is an ordinary retransmission mechanism in which, when the transmitter transmits data to the receiver, the receiver transmits an ack in response to the data. If the ack is an ack making a request for retransmission of the data, the transmitter retransmits the data to the receiver. If the receiver receives the retransmitted data, the receiver transmits another ack to the transmitter to request the transmitter that next data be transmitted. As shown in the lower portion of FIG. 15, on the other hand, an apparatus implemented by an embodiment of the present invention is provided in a network between the transmitter and the receiver. In a buffer employed in the apparatus, data that is most likely to be retransmitted in the future is stored in advance so that, when the receiver transmits ack-1 making a request for retransmission of data to the transmitter, the apparatus provided in the network as the apparatus implemented by an embodiment of the present invention catches ack-1 and retransmits the data stored in the buffer to the receiver. Thus, a high-speed communication can be implemented to allow the receiver to receive the retransmitted packet from the apparatus in a short period of time.

In addition, assume for example that the apparatus provided in the network as the apparatus implemented by an embodiment of the present invention carries out operations at the IP layer while control of retransmission is executed at the TCP layers of the transmitter and the receiver. In this case, in this embodiment, the apparatus provided in the network obtains information on the TCP layer without terminating the packet in spite of the fact that the apparatus operates at the IP layer so that the apparatus essentially carries out a process serving as a substitute for a process implementing operations at the TCP layers.

In accordance with the embodiments of the present invention, in a reliable encrypted-data communication, a process to re-encrypt a packet to be retransmitted can be eliminated. Even in the case of a communication of unencrypted data, a packet to be retransmitted can be retransmitted from an apparatus provided in the mid of a network so that the reliable communication can be made more efficient.

What is claimed is:

1. A communication apparatus communicating with another communication apparatus, comprising:
   a buffer to store an encrypted packet transmitted to a second communication apparatus;
   a recognition processor to recognize a packet inputted from the second communication apparatus via a low-level hierarchical layer, the recognition processor determining whether or not retransmission is required;
   a substitute processor to transfer an acknowledgement packet which is responsive to sending the encrypted packet to the second communication apparatus to a high level hierarchical layer when the acknowledgement packet indicates that the retransmission is not required and to discard the acknowledgement packet responsive to sending the encrypted packet to the second communication apparatus when the acknowledgement packet indicates that the retransmission is required; and
   a selector to transmit the encrypted packet to the second communication apparatus via the low-level hierarchical layer when the retransmission is required.

2. The communication apparatus according to claim 1, wherein
   the high level hierarchical layer is a transport layer, and the low-level hierarchical layer is a link layer.

3. The communication apparatus according to claim 2, wherein said recognition processor receives the packet via low level hierarchical layer using IPSec as a protocol.

4. The communication apparatus according to claim 1, wherein said low level hierarchical layer uses internet protocol.

5. The communication apparatus according to claim 1, wherein said high level hierarchical layer communicates using transmission control protocol.

6. A communication method for a first communication apparatus communicating with a second communication apparatus, the first communication apparatus including a buffer to store an encrypted packet transmitted to the second communication apparatus, the method comprising:
   recognizing a packet inputted from the second communication apparatus via low-level hierarchical layer;
   determining whether or not retransmission is required;
   transferring an acknowledgement packet responsive to sending the encrypted packet to the second communication apparatus to a high level hierarchical layer when the acknowledgement packet indicates that the retransmission is not required;
   discarding the acknowledgement packet responsive to sending the encrypted packet to the second communication apparatus when the acknowledgement packet indicates that the retransmission is required; and
   transmitting the encrypted packet to the second communication apparatus via the low-level hierarchical layer when the retransmission is required.

7. The communication method according to claim 6, wherein the high level hierarchical layer is a transport layer, and the low-level hierarchical layer is a link layer.

8. A non-transitory computer-readable storage medium storing a program directing a computer to realize functions of a communication apparatus communicating with a second communication apparatus, the apparatus comprising:
   a buffer to store an encrypted packet transmitted to the second communication apparatus;
   a recognition processor to recognize a packet inputted from the second communication apparatus via a low-level hierarchical layer, the recognition processor determining whether or not retransmission is required;
   a substitute processor to transfer an acknowledgement packet responsive to sending the encrypted packet to the second communication apparatus to a high level hierarchical layer when the acknowledgement packet indicates that the retransmission is not required and to discard the acknowledgement packet responsive to sending the encrypted packet to the second communication apparatus when the acknowledgement packet indicates that the retransmission is required; and
   a selector to transmit the encrypted packet to the second communication apparatus via the low-level hierarchical layer when the retransmission is required.

* * * * *